US011212839B2

(12) United States Patent
Zhang (10) Patent No.: US 11,212,839 B2
(45) Date of Patent: Dec. 28, 2021

(54) METHOD FOR RANDOM ACCESS AND TERMINAL DEVICE (71) Applicant: Guangdong OPPO Mobile Telecommunications Corp., Ltd., Guangdong (CN)

(72) Inventor: Zhi Zhang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/496,237

(22) PCT Filed: Mar. 24, 2017

(86) PCT No.: PCT/CN2017/078103
§ 371 (c)(1),
(2) Date: Sep. 20, 2019

(87) PCT Pub. No.: WO2018/170892
PCT Pub. Date: Sep. 27, 2018

(65) Prior Publication Data
US 2020/0029367 A1    Jan. 23, 2020

(51) Int. Cl.
H04W 74/08    (2009.01)
H04W 76/11    (2018.01)
H04W 28/08    (2009.01)
H04W 56/00    (2009.01)
H04W 72/14    (2009.01)

(52) U.S. Cl.
CPC ....... H04W 74/0833 (2013.01); H04W 28/08 (2013.01); H04W 56/0045 (2013.01); H04W 72/14 (2013.01); H04W 76/11 (2018.02)

(58) Field of Classification Search
None
See application file for complete search history.

(56) References Cited

U.S. PATENT DOCUMENTS 9,655,077 B1 * 5/2017 Roth ................. H04W 64/006
2008/0117878 A1 * 5/2008 Kim .................... H04W 36/02
370/331

(Continued)

FOREIGN PATENT DOCUMENTS

CN    102457943 A    5/2012
CN    103763783 A    4/2014

(Continued)

OTHER PUBLICATIONS

Extended EP Search Report for 17901975.7 dated Nov. 21, 2019.

(Continued)

Primary Examiner — Anh Ngoc M Nguyen
(74) Attorney, Agent, or Firm — Young Basile Hanlon & MacFarlane, P.C.

(57) ABSTRACT

A method for a terminal device to access a network, a terminal device and a network device are provided. The method includes: sending a random access preamble by a terminal device; receiving, by the terminal device, indication information sent by a first network device; and receiving, by the terminal device, random access response information sent by at least one network device according to the indication information, wherein the at least one network device comprises the first network device.

13 Claims, 5 Drawing Sheets (56) References Cited

U.S. PATENT DOCUMENTS

| | | | |
|---|---|---|---|
| 2011/0110258 A1 | 5/2011 | Ishii et al. | |
| 2013/0083739 A1* | 4/2013 | Yamada | H04W 74/006 370/329 |
| 2014/0226609 A1* | 8/2014 | Hooli | H04W 72/042 370/329 |
| 2016/0219625 A1* | 7/2016 | Lee | H04W 74/0833 |
| 2017/0041841 A1* | 2/2017 | Pedersen | H04W 36/08 |
| 2017/0265243 A1* | 9/2017 | Hahn | H04W 76/19 |
| 2018/0020486 A1 | 1/2018 | Yano et al. | |
| 2018/0160378 A1* | 6/2018 | Bergquist | H04W 74/0833 |

FOREIGN PATENT DOCUMENTS

| | | | |
|---|---|---|---|
| CN | 105050198 A | 11/2015 | |
| KR | 20130036923 A | 4/2013 | |
| WO | 2011136508 A2 | 11/2011 | |
| WO | 2016163010 A1 | 10/2016 | |
| WO | 2016171445 A1 | 10/2016 | |
| WO | 2016171731 A1 | 10/2016 | |
| WO | 2016195575 A1 | 12/2016 | |

OTHER PUBLICATIONS

3GPP TSGRAN WG2 Meeting #94; R2-163372; Nanjing, China, May 23-27, 2016.
3GPP TSGRAN WG2 Meeting #97; R1-1701124; Athens, Greece, Jan. 13-17, 2017.
Examination of EP Application 17901975.7 dated Jul. 28, 2020.
3GPP TSG RAN WG1 Meeting #87; R1-1613120; Reno, USA, Nov. 14-18, 2016.
India First Examination Report for IN Application 201917038222 dated Jan. 27, 2021.
Japan First Office Action with English Translation for JP Application 2019-551967 dated Jan. 28, 2021.
Korea First Office Action with English Translation for KR Application 10-2019-7027785 dated Jan. 15, 2021.
Korean Office Action with English Translation for KR Application 10-2019-7027785 dated Jul. 29, 2021. (8 pages).
Chinese Examination Report with English Translation for CN Application 201780088921.X dated May 7, 2021. (22 pages).

* cited by examiner

METHOD FOR RANDOM ACCESS AND TERMINAL DEVICE

CROSS-REFERENCE TO RELATED APPLICATION(S)

This application is a 371 application of International Application No. PCT/CN2017/078103, filed on Mar. 24, 2017, the entire disclosure of which is hereby incorporated by reference.

TECHNICAL FIELD

The present disclosure relates to the field of communications, in particular to a method for a terminal device to access a network, a terminal device and a network device.

BACKGROUND

In a Long Term Evolution (LTE) system, when a terminal device in an idle state initiates an initial network access request to a base station in a resident cell, its neighboring cells may receive a Physical Random Access Channel (PRACH) preamble sent by the terminal device at the same time, for example, the terminal device is located in an edge region of several cells at the time. If the cells receiving the PRACH preamble are configured with PRACH resources on the same time-frequency resources, these cells can all reply Random Access Response (RAR) information to the terminal device.

However, in LTE, the terminal device does not detect a downlink control channel of a non-resident cell. Therefore, even if different base stations corresponding to different cells feedback RAR information to the terminal device, the terminal device will not detect it. Currently, the terminal device only selects to receive RAR information sent by the base station corresponding to the resident cell, which is not applicable to 5G (new radio, NR) systems.

SUMMARY

The present disclosure provides a method for a terminal device to access a network, a terminal device and a network device.

In a first aspect, a method for a terminal device to access a network is provided. The method includes: sending a random access preamble by a terminal device; receiving, by the terminal device, indication information sent by a first network device; and receiving, by the terminal device, random access response information sent by at least one network device according to the indication information, wherein the at least one network device includes the first network device.

It should be understood that the terminal device initiates an access request in a resident cell and sends a random access preamble (PRACH preamble) to the network device. The terminal device may receive indication information sent by the first network device. The first network device may be a network device corresponding to the resident cell. The indication information may indicate the terminal device to receive RAR information sent by the at least one network device. The at least one network device includes the first network device.

Optionally, the indication information may indicate that the terminal device only receives RAR information sent by the first network device. After sending the PRACH preamble, the terminal device needs to receive the RAR information sent by the first network device in an RAR window for waiting to receive the RAR information, without detecting RAR information sent by other network devices.

It should be understood that the first network device may send the indication information by cell system information broadcasting (SIB).

In combination with the first aspect, in an implementation of the first aspect, the indication information is used for indicating the terminal device to receive the random access response information sent by the first network device and a second network device, wherein the at least one network device includes the second network device. Receiving, by the terminal device, the random access response information sent by the at least one network device according to the indication information includes: receiving, by the terminal device, the random access response information sent by the first network device and the second network device.

When the at least one network device includes the first network device and the second network device, after sending the PRACH preamble, the terminal device receives RAR information sent by the first network device and RAR information sent by the second network device indicated in the indication information in the RAR window until the RAR window ends. The second network device may refer to one or more network devices corresponding to a non-resident cell. For example, the non-resident cell may be another cell to which access is not initiated and is adjacent to the resident cell.

In combination with the first aspect and the foregoing implementations, in another implementation of the first aspect, the indication information includes an identification of the at least one network device.

It should be understood that the identification of the at least one network device may be a cell ID list of the at least one network device.

Optionally, the identification of the at least one network device in the indication information may be a cell ID of the at least one network device and a Random Access Radio Network Temporary Identifier (RA_RNTI).

In combination with the first aspect and the foregoing implementations, in another implementation of the first aspect, after the terminal device receives the random access response information sent by the at least one network device according to the indication information, the method further includes: determining, by the terminal device, a target network device among the at least one network device; and sending, by the terminal device, a message 3 to the target network device.

In combination with the first aspect and the foregoing implementations, in another implementation of the first aspect, random access response information of each network device among the at least one network device includes timing advance and/or a load ratio of the each network device, wherein the timing advance is propagation delay of an uplink wireless signal from the terminal device to the each network device. Determining, by the terminal device, the target network device among the at least one network device includes: determining, by the terminal device, the target network device among the at least one network device according to the timing advance and/or the load ratio.

In combination with the first aspect and the foregoing implementations, in another implementation of the first aspect, the indication information includes a preset rule. Determining, by the terminal device, the target network device among the at least one network device according to the timing advance and/or the load ratio includes: determining, by the terminal device, the target network device among the at least one network device according to the timing advance and/or the load ratio in accordance with the preset rule.

It should be understood that the terminal device determines the target network device among the at least one network device according to the timing advance and/or the load ratio in accordance with the preset rule. The preset rule may be set in the terminal device in advance or configured for the terminal device through the first network device.

In combination with the first aspect and the foregoing implementations, in another implementation of the first aspect, the preset rule is to determine that a network device corresponding to minimum timing advance among the at least one network device is the target network device; or the preset rule is to determine that a network device with a minimum load ratio among the at least one network device is the target network device.

Optionally, the target network device may be determined upon the combination of the timing advance and the load ratio. For example, one or more network devices with the minimum load ratio are determined among the multiple network devices, a network device corresponding to the minimum TA is determined among the one or more network devices, and the network device is determined as the target network device.

When the terminal device selects a network device with small timing advance to access, it can access a network device with a short distance to the terminal device, thus improving the transmission efficiency. The terminal device selects a network device with a small load ratio to access, thus balancing the network load.

In combination with the first aspect and the foregoing implementations, in another implementation of the first aspect, determining, by the terminal device, the target network device among the at least one network device includes: sending, by the terminal device, the message 3 to each network device among the at least one network device, wherein the message 3 includes an identification of the at least one network device; and determining, by the terminal device, that the target network device is a network device sending the message 4.

In combination with the first aspect and the foregoing implementations, in another implementation of the first aspect, determining, by the terminal device, the target network device among the at least one network device includes: sending, by the terminal device, the message 3 to partial network devices among the at least one network device, wherein the message 3 includes identifications of the partial network devices; and determining, by the terminal device, that the target network device is a network device sending the message 4.

In combination with the first aspect and the foregoing implementations, in another implementation of the first aspect, sending, by the terminal device, the message 3 to partial network devices among the at least one network device includes: determining, by the terminal device, a third network device among the at least one network device according to a preset rule, wherein the third network device is one of network devices which configure the terminal device with a same UL Grant which is uplink scheduling signaling; and sending, by the terminal device, the message 3 to the third network device and other network devices, wherein the other network devices are network devices among the at least one network device except the network devices which configure the terminal device with the same UL Grant.

In a second aspect, a method for a terminal device to access a network is provided. The method includes: receiving, by a first network device, a random access preamble sent by a terminal device; sending, by the first network device, indication information to the terminal device, wherein the indication information is used for indicating the terminal device to receive random access response information sent by at least one network device, and the at least one network device includes the first network device; and sending, by the first network device, first random access response information to the terminal device according to the random access preamble.

In combination with the second aspect, in an implementation of the second aspect, the indication information includes an identification of the at least one network device.

In combination with the second aspect and the foregoing implementations, in another implementation of the second aspect, the method further includes: receiving, by the first network device, a message 3 sent by the terminal device, wherein the message 3 includes identifications of partial or all network devices among the at least one network device, and the partial or all network devices include the first network device; and negotiating, by the first network device, with other network devices except the first network device among the partial or all network devices according to the identifications of the partial or all network devices, and determining a target network device that sends a message 4 to the terminal device.

In a third aspect, a method for a terminal device to access a network is provided. The method includes: receiving, by a second network device, a random access preamble sent by a terminal device; sending, by the second network device, second random access response information to the terminal device according to the random access preamble; receiving, by the second network device, a message 3 sent by the terminal device, wherein the message 3 includes identifications of at least two network devices; and negotiating, by the second network device, with other network devices except the second network device among the at least two network devices according to the identifications of the at least two network devices, and determining a target network device that sends a message 4 to the terminal device.

In a fourth aspect, a terminal device is provided for executing the method in the first aspect or the method in any possible implementation of the first aspect described above. Specifically, the terminal device includes units for executing the method in the first aspect or the method in any possible implementation of the first aspect described above.

In a fifth aspect, a network device is provided for executing the method in the second aspect or the method in any possible implementation of the second aspect described above. Specifically, the network device includes units used for executing the method in the second aspect or the method in any possible implementation of the second aspect described above.

In a sixth aspect, a network device is provided for executing the method in the third aspect or the method in any possible implementation of the third aspect described above. Specifically, the network device includes units used for executing the method in the third aspect or the method in any possible implementation of the third aspect described above.

In a seventh aspect, a terminal device is provided, including a memory and a processor, the memory is used for storing instructions, the processor is used for executing the instructions stored in the memory, and when the processor executes the instructions stored in the memory, the execution causes the processor to execute the method of the first aspect or the method in any possible implementation of the first aspect.

In an eighth aspect, a network device is provided, including a memory and a processor, the memory is used for storing instructions, the processor is used for executing the instructions stored in the memory, and when the processor executes the instructions stored in the memory, the execution causes the processor to execute the method of the second aspect or the method in any possible implementation of the second aspect.

In a ninth aspect, a network device is provided, including a memory and a processor, the memory is used for storing instructions, the processor is used for executing the instructions stored in the memory, and when the processor executes the instructions stored in the memory, the execution causes the processor to execute the method of the third aspect or the method in any possible implementation of the third aspect.

In a tenth aspect, a computer readable medium is provided, used for storing a computer program, the computer program includes instructions for executing the method of the first aspect or the method in any possible implementation of the first aspect.

In an eleventh aspect, a computer readable medium is provided for storing a computer program, and the computer program includes instructions for executing the method in the second aspect or the method in any possible implementation of the second aspect.

In a twelfth aspect, a computer readable medium is provided for storing a computer program, and the computer program includes instructions for executing the method in the third aspect or the method in any possible implementation of the third aspect.

DETAILED DESCRIPTION

Hereinafter, technical solutions in the implementations of the present disclosure will be described with reference to the accompanying drawings.

It should be understood that the technical solutions of the implementations of the present disclosure may be applied to various communication systems, such as a Global System of Mobile Communication (GSM) system, a Code Division Multiple Access (CDMA) system, a Wideband Code Division Multiple Access (WCDMA) system, a Long Term Evolution (LTE) system, a LTE Frequency Division Duplex (FDD) system, a LTE Time Division Duplex (TDD) system, a Universal Mobile Telecommunication System (UMTS), and a future 5G communication system.

Various implementations are described herein in connection with terminal devices in the present disclosure. The terminal device may also refer to a User Equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, an on-board device, a wearable device, a terminal device in a future 5G network, or a terminal device in a future evolving Public Land Mobile Network (PLMN), or the like.

Various implementations are described herein in connection with network devices in the present disclosure. A network device may be a device for communicating with a terminal device, such as a Base Transceiver Station (BTS) in a GSM or CDMA system, a NodeB (NB) in a WCDMA system, or an Evolutional Node B (eNB or eNodeB) in an LTE system, or the network device may be a relay station, an access point, a vehicle-mounted device, a wearable device, a network side device in a future 5G network, or a network side device in a future evolved PLMN network, etc.

Figure 1:
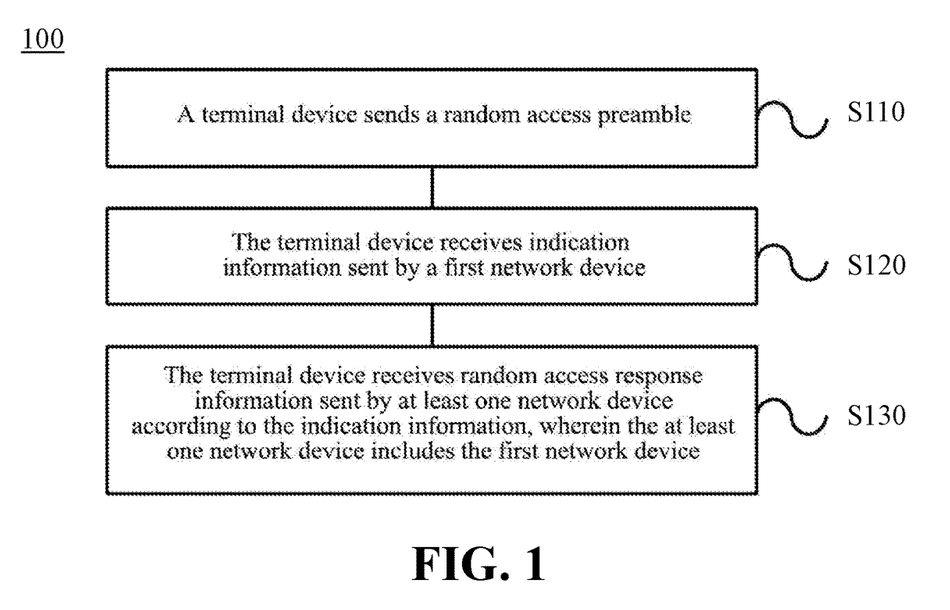
FIG. 1 is a schematic flowchart of a method for a terminal device to access a network according to an implementation of the present disclosure.

FIG. 1 shows a schematic flowchart of a method 100 for a terminal device to access a network according to an implementation of the present disclosure. The method 100 may be executed by a terminal device. Specifically, as shown in FIG. 1, the method 100 includes acts S110-S130.

In S110, a terminal device sends a random access preamble.

In S120, the terminal device receives indication information sent by a first network device.

In S130, the terminal device receives random access response information sent by at least one network device according to the indication information, wherein the at least one network device includes the first network device.

Specifically, it should be understood that the terminal device initiates an access request in a resident cell and sends a random access preamble to the network device. The terminal device may receive indication information sent by the first network device, and the indication information may indicate the terminal device to detect random access response RAR information sent by the at least one network device after sending in the resident cell a PRACH preamble request to access a network. For example, the indication information may indicate that the terminal device only detects RAR information of the first network device, and the first network device is the resident cell where the terminal device initiates the PRACH preamble. Alternatively, the indication information may indicate the terminal device to detect RAR information sent by multiple network devices, and the multiple network devices include the first network device and other network devices that receive the PRACH preamble.

Therefore, in the method for the terminal device to access a network according to an implementation of the present disclosure, the terminal device sends a random access preamble to a network device, and receives indication information sent by the network device, and the terminal device is indicated through the indication information to receive random access response information sent by at least one network device. As a result, the terminal device can select a network device to access among the at least one network device, thereby improving the utilization rate of the system.

In S110, the terminal device sends the PRACH preamble. When the terminal device in an idle state initiates an initial access request in the resident cell, it can use PRACH resources to send the PRACH preamble to the network device. Since different cells can have different PRACH resources, when the terminal device sends a PRACH preamble on PRACH resources shared by multiple cells, network devices corresponding to the multiple cells can receive the PRACH preamble.

In S120, the terminal device receives the indication information sent by the first network device, and the indication information is used for indicating the terminal device to receive the RAR information sent by the at least one network device. Specifically, the first network device may be a network device corresponding to the resident cell, and the first network device may send the indication information by cell system information broadcasting (SIB).

It should be understood that the indication information may include an identification of the at least one network device. Specifically, the first network device may provide a cell ID list of the at least one network device in the indication information.

Optionally, the indication information may further include a Random Access Radio Network Temporary Identifier (RA_RNTI). In the prior art, in a random access procedure, a terminal device needs to detect RAR information transmitted on a Physical Downlink Control Channel (PDCCH) through an RA_RNTI. Therefore, the terminal device needs to receive corresponding RAR information through the RA_RNTI, and the RA_RNTI is only related to time-frequency resources used to initiate a PRACH preamble. However, in the implementation of the present disclosure, the indication information may include a cell ID list and an RA_RNTI, that is, the terminal device may determine at least one network device through the cell ID list together with the RA_RNTI.

It should be understood that only the PRACH preamble sent on PRACH resources shared by various cells can be received by network devices corresponding to the multiple cells. Therefore, when the first network device indicates the terminal to receive the RAR information of the at least one network device through the indication information, the first network device can more specifically indicate PRACH resources, on which only if the PRACH preamble is sent, the corresponding terminal device needs to receive response (RAR) from network devices corresponding to multiple cells in the RAR window. These PRACH resources may be a part of PRACH resources of the cell, and may be specifically indicated by at least one of time, frequency, and code domain resources.

In S130, the terminal device receives the random access response information sent by the at least one network device according to the indication information, wherein the at least one network device includes the first network device. Specifically, the terminal device determines the at least one network device according to the indication information. The at least one network device includes the first network device and may also include a second network device. The second network device may refer to one or more network devices corresponding to a non-resident cell. For example, the non-resident cell may be another cell to which access is not initiated and is adjacent to the resident cell.

When the at least one network device includes only the first network device, after sending the PRACH preamble, the terminal device needs to receive RAR information sent by the first network device in the RAR window for waiting to receive RAR information, but does not detect RAR information sent by other network devices. When the at least one network device includes the first network device and other network devices, that is, when the second network device is also included, after sending the PRACH preamble, the terminal device receives RAR information sent by the first network device and RAR information sent by other network devices indicated in the indication information in the RAR window until the RAR window ends. The second network device may refer to one or more network devices.

In the implementation of the present disclosure, when the terminal device receives RAR information of multiple network devices according to the indication information, that is, when the number of the at least one network device indicated by the indication information is greater than or equal to two, a target network device can be determined among the multiple network devices according to a preset rule. The terminal device sends a message 3 (Msg3) to the target network device and receives a message 4 (Msg4) sent by the target network device, so that the terminal device can establish a connection with the target network device. The Msg3 sent by a terminal device when accessing a cell in the prior art can be multiplexed to be the Msg3 and Msg4 herein.

Specifically, RAR information sent by each network device among the multiple network devices may include timing advance (TA) and/or a load ratio of the each network device. TA represents propagation delay of an uplink signal from the terminal device to the network device, and the load ratio may represent a currently busy or idle state of the network device. The terminal device receives RAR information sent by each of the multiple network devices, and determines the target network device among the multiple network devices according to TA and/or a load ratio of each network device in the RAR information.

Optionally, the preset rule may be to determine that a network device corresponding to minimum TA among the multiple network devices is the target network device. The terminal device can select a cell with a short distance to access.

Optionally, the preset rule may be to determine that a network device with a minimum load ratio among the multiple network devices is the target network device, thereby balancing the network load.

Optionally, the preset rule may be to determine the target network device among the multiple network devices upon the combination of the TA and load ratio. For example, one or more network devices with the minimum load ratio are determined among the multiple network devices, a network device corresponding to the minimum TA is determined among the one or more network devices, and the network device is determined as the target network device.

It should be understood that the terminal device can determine the target network device to access among the multiple network devices corresponding to the received multiple RAR information according to the above preset rule. The preset rule may be configured for the terminal device in advance or configured for the terminal device through the first network device. For example, the indication information sent by the first network device to the terminal device may include the preset rule, and the implementation of the present disclosure is not limited to this.

It should be understood that the terminal device determines the target network device among the multiple network devices, and sends the Msg3 to the target network device according to indication of a UL grant (uplink scheduling information) contained in RAR information sent by the target network device, thereby completing the PRACH process of the terminal device.

In the implementation of the present disclosure, when the terminal device receives RAR information of multiple network devices according to the indication information, that is, when the number of the at least one network device indicated by the indication information is greater than or equal to two, the terminal device may send the Msg3 to partial or all network devices among the multiple network devices. The Msg3 may include identifications of the partial or all network devices so that the partial or all network devices may negotiate to determine the target network device. The target network device sends the Msg4 to the terminal device, so that the terminal device establishes a connection with the target network device.

Optionally, the terminal device may send the Msg3 to partial network devices among the multiple network devices. Specifically, when the multiple network devices include network devices which configure the terminal device with a same UL Grant which is uplink scheduling signaling, the terminal device can determine, according to a preset rule, a third network device among these network devices which configure the terminal device with the same UL Grant. The preset rule may be to determine the third network device according to the TA and/or the load ratio of each network device in the RAR information.

For example, the terminal device receives RAR information sent by four network devices, namely network devices A, B, C and D. The network device B and network device D configure the same UL Grant for the terminal device, then the terminal device can determine the network device B or network device D based on the TA and/or load ratio in RAR information sent by the network device B and network device D. For example, the TA of the network device B is much smaller than that of the network device D. According to the preset rule, the terminal device determines that the network device B is the third network device, then the terminal device sends the Msg3 to the network devices A, B and C. The Msg3 includes identifications of the network devices A, B and C, so that the network devices A, B and C may negotiate to determine the target network device. For example, if the network device C is determined to be the target network device, the network device C sends Msg4 to the terminal device to facilitate the terminal device to access the network device C.

Optionally, the terminal device may send the Msg3 to all network devices among the multiple network devices. If there are not network devices configuring the terminal device with the same UL grant among the all network devices, the terminal device sends the Msg3 to each network device among the all network devices, the Msg3 includes the identifications of the all network devices, the all network devices negotiate to determine the target network device, and the target network device sends the Msg4 to the terminal device so that the terminal device accesses the cell of the target network device.

Therefore, in a method for a terminal device to access a network according to an implementation of the present disclosure, a terminal device sends a random access preamble to a network device, and receives indication information sent by the network device, and the terminal device is indicated through the indication information to receive random access response information sent by at least one network device. As a result, the terminal device can select a network device to access among the at least one network device, thereby improving the utilization rate of the system.

Figure 2:
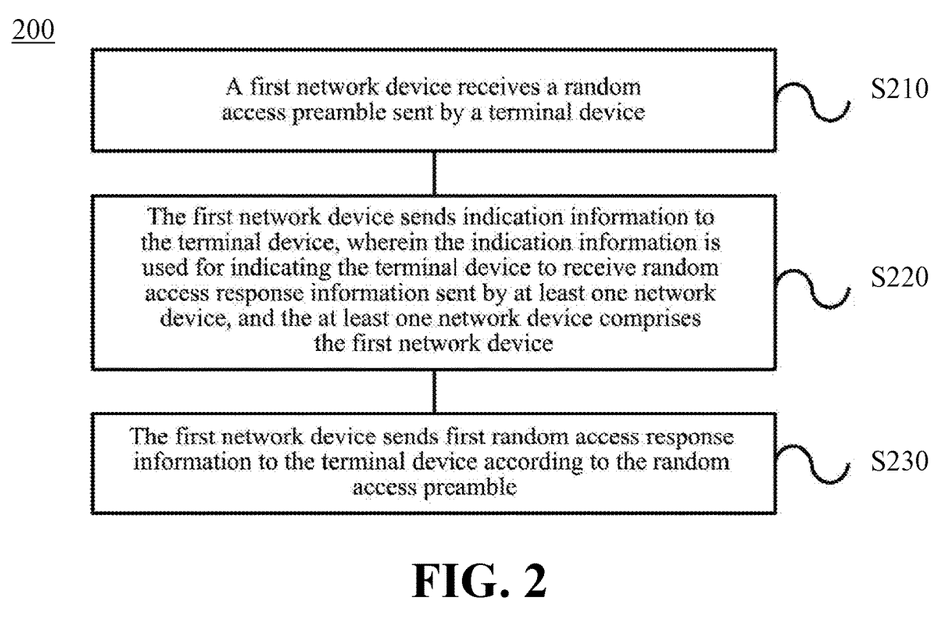
FIG. 2 is another schematic flowchart of a method for a terminal device to access a network according to an implementation of the present disclosure.

FIG. 2 shows a schematic flowchart of a method 200 for a terminal device to access a network according to an implementation of the present disclosure. The method 200 may be executed by a network device. Specifically, as shown in FIG. 2, the method 200 includes acts S210-S230.

In S210, a first network device receives a random access preamble sent by a terminal device.

In S220, the first network device sends indication information to the terminal device, wherein the indication information is used for indicating the terminal device to receive random access response information sent by at least one network device, and the at least one network device includes the first network device.

In S230, the first network device sends first random access response information to the terminal device according to the random access preamble.

Optionally, the indication information includes an identification of the at least one network device.

Optionally, the method further includes: receiving, by the first network device, a message 3 sent by the terminal device, wherein the message 3 includes identifications of partial or all network devices among the at least one network device, and the partial or all network devices include the first network device; and negotiating, by the first network device, with other network devices except the first network device among the partial or all network devices according to the identifications of the partial or all network devices to determine a target network device that sends a message 4 to the terminal device.

It should be understood that the first network device in the implementation of the present disclosure corresponds to the first network device in the method 100 and can correspondingly implement the method of the first network device in the method 100, which will not be described here.

Therefore, in a method for a terminal device to access a network according to an implementation of the present disclosure, a terminal device sends a random access preamble to a network device. The network device sends indication information to the terminal device, and indicates, through the indication information, the terminal device to receive random access response information sent by at least one network device. As a result, the terminal device can select a network device to access among the at least one network device, thereby improving the utilization rate of the system.

Figure 3:
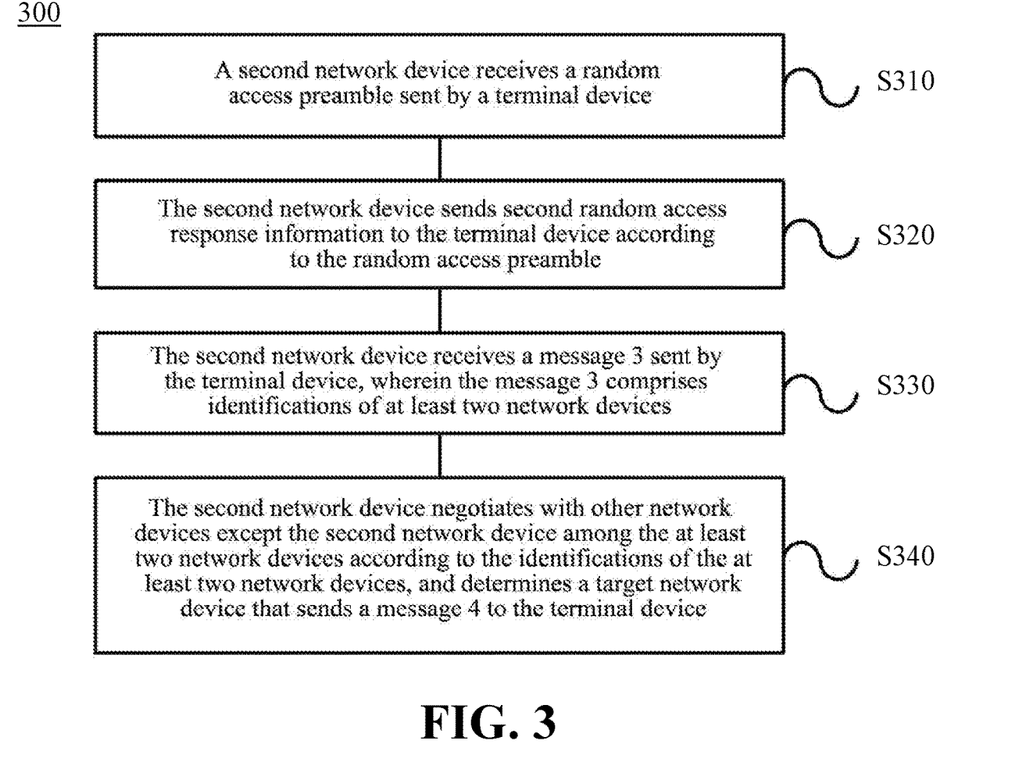
FIG. 3 is yet another schematic flowchart of a method for a terminal device to access a network according to an implementation of the present disclosure.

FIG. 3 shows a schematic flowchart of a method 200 for a terminal device to access a network according to an implementation of the present disclosure. The method 300 may be executed by a network device. Specifically, as shown in FIG. 3, the method 300 includes acts S310-S340.

In S310, a second network device receives a random access preamble sent by a terminal device.

In S320, the second network device sends second random access response information to the terminal device according to the random access preamble.

In S330, the second network device receives a message 3 sent by the terminal device, wherein the message 3 includes identifications of at least two network devices.

In S340, the second network device negotiates with other network devices except the second network device among the at least two network devices according to the identifications of the at least two network devices, and determines a target network device that sends a message 4 to the terminal device.

It should be understood that the second network device in the implementation of the present disclosure corresponds to the second network device in the method 100 and can correspondingly implement the method of the second network device in the method 200, which will not be described here.

Therefore, in a method for a terminal device to access a network according to an implementation of the present disclosure, a terminal device sends a random access preamble to a network device. The network device sends indication information to the terminal device, and indicates, through the indication information, the terminal device to receive random access response information sent by at least one network device. As a result, the terminal device can select a network device to access among the at least one network device, thereby improving the utilization rate of the system.

It should be understood that in various implementations of the present disclosure, sequence numbers of the various processes do not imply an order of execution of the various processes, which should be determined by their functions and internal logics, and should not constitute any limitation on implementation processes of the implementations of the present disclosure.

A method for a terminal device to access a network according to an implementation of the present disclosure is described in detail above with reference to FIGS. 1 to 3. An apparatus for a terminal device to access a network according to an implementation of the present disclosure will be described below with reference to FIGS. 4 to 9.

Figure 4:
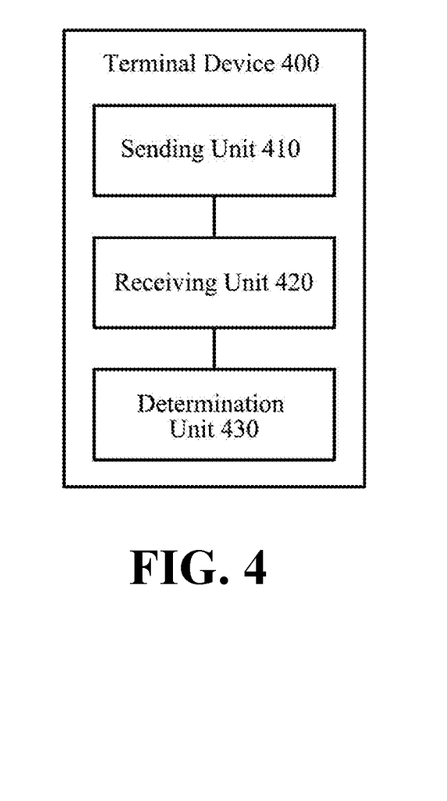
FIG. 4 is a schematic block diagram of a terminal device according to an implementation of the present disclosure.

As shown in FIG. 4, according to an implementation of the present disclosure, a terminal device 400 includes: a sending unit 410 and a receiving unit 420.

The sending unit 410 is used for sending a random access preamble.

The receiving unit 420 is used for receiving indication information sent by a first network device.

The receiving unit 420 is further used for receiving random access response information sent by at least one network device according to the indication information, where the at least one network device includes the first network device.

Therefore, in an implementation of the present disclosure, a terminal device sends a random access preamble to a network device, and receives indication information sent by the network device, and the terminal device is indicated through the indication information to receive random access response information sent by at least one network device. As a result, the terminal device can select a network device to access among the at least one network device, thereby improving the utilization rate of the system.

Optionally, the indication information is used for indicating the terminal device to receive the random access response information sent by the first network device and a second network device, wherein the at least one network device includes the second network device. The receiving unit 420 is further used for receiving the random access response information sent by the first network device and the second network device.

Optionally, the indication information includes an identification of the at least one network device.

Optionally, the terminal device further includes: a determination unit 430, used for determining a target network device among the at least one network device after the receiving unit 420 receives the random access response information sent by the at least one network device according to the indication information. The sending unit 430 is further used for sending a message 3 to the target network device.

Optionally, random access response information of each network device among the at least one network device includes timing advance and/or a load ratio of the each network device, wherein the timing advance is propagation delay of an uplink wireless signal from the terminal device to the each network device. The determination unit 430 is further used for determining the target network device among the at least one network device according to the timing advance and/or the load ratio.

Optionally, the indication information includes a preset rule, and the determination unit 430 is further used for determining the target network device among the at least one network device according to the timing advance and/or the load ratio in accordance with the preset rule.

Optionally, the preset rule is to determine that a network device corresponding to minimum timing advance among the at least one network device is the target network device; or the preset rule is to determine that a network device with a minimum load ratio among the at least one network device is the target network device.

Optionally, the sending unit 410 is further used for sending the message 3 to partial or all network devices among the at least one network device, wherein the message 3 includes identifications of the partial or all network devices. The determination unit 430 is further used for determining that a network device sending the message 4 is the target network device.

Optionally, the determination unit 430 is further used for determining a third network device among the at least one network device according to a preset rule, wherein the third network device is one of network devices which configure the terminal device with a same UL Grant which is uplink scheduling signaling. The sending unit 410 is further used for sending the message 3 to the third network device and other network devices. The other network devices are network devices among the at least one network device except the network devices which configure the terminal device with the same UL Grant.

It should be understood that the terminal device 400 according to the implementation of the present disclosure may correspondingly perform the method 100 in the implementation of the present disclosure, and the above and other operations and/or functions of each unit in the terminal device 400 are respectively for realizing each corresponding flow of the method in FIG. 1, and will not be repeated here for the sake of brevity.

Therefore, in an implementation of the present disclosure, a terminal device sends a random access preamble to a network device, and receives indication information sent by the network device, and the terminal device is indicated through the indication information to receive random access response information sent by at least one network device. As a result, the terminal device can select a network device to access among the at least one network device, thereby improving the utilization rate of the system.

Figure 5:
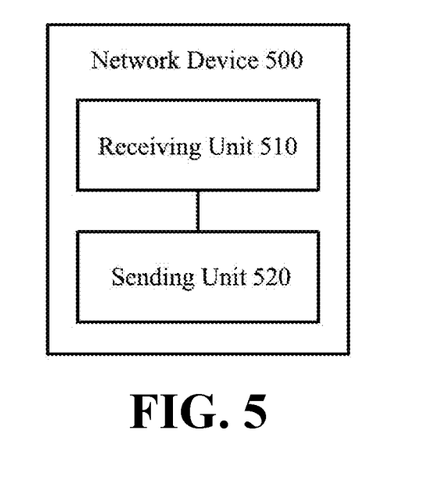
FIG. 5 is a schematic block diagram of a network device according to an implementation of the present disclosure.

As shown in FIG. 5, according to an implementation of the present disclosure, a network device 500 includes: a receiving unit 510 and a sending unit 520.

The receiving unit 510 is used for receiving a random access preamble sent by a terminal device.

The sending unit 520 is used for sending indication information to the terminal device. The indication information is used for indicating the terminal device to receive random access response information sent by at least one network device. The at least one network device includes the network device.

The sending unit 520 is further used for sending first random access response information to the terminal device according to the random access preamble.

Therefore, an implementation of the present disclosure provides a network device. With regard to a random access preamble that a terminal device sends to the network device, the network device indicates the terminal device to receive random access response information sent by at least one network device by sending indication information to the terminal device. As a result, the terminal device can select a network device to access among the at least one network device, thereby improving the utilization rate of the system.

Optionally, the indication information includes an identification of the at least one network device.

Optionally, the receiving unit 510 is further used for receiving a message 3 sent by the terminal device. The message 3 includes identifications of partial or all network devices among the at least one network device, and the partial or all network devices include the network device. The receiving unit 510 is further used for negotiating with other network devices except the network device among the partial or all network devices according to the identifications of the partial or all network devices, and determining a target network device that sends a message 4 to the terminal device.

It should be understood that the network device 500 according to the implementation of the present disclosure may correspondingly perform the method 200 in the implementation of the present disclosure, and the above and other operations and/or functions of each unit in the network device 500 are respectively for realizing each corresponding flow of the method in FIG. 2, and will not be repeated here for the sake of brevity.

Therefore, an implementation of the present disclosure provides a network device. With regard to a random access preamble that a terminal device sends to the network device, the network device indicates the terminal device to receive random access response information sent by at least one network device by sending indication information to the terminal device. As a result, the terminal device can select a network device to access among the at least one network device, thereby improving the utilization rate of the system.

Figure 6:
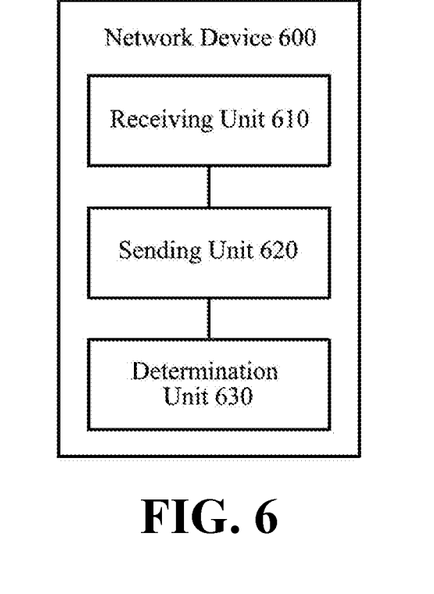
FIG. 6 is another schematic block diagram of a network device according to an implementation of the present disclosure.

As shown in FIG. 6, according to an implementation of the present disclosure, a network device 600 includes: a receiving unit 610, a sending unit 620, and a determination unit 630.

The receiving unit 610 is used for receiving a random access preamble sent by a terminal device.

The sending unit 620 is used for sending second random access response information to the terminal device according to the random access preamble.

The receiving unit 610 is further used for receiving a message 3 sent by the terminal device, wherein the message 3 includes identifications of at least two network devices.

The determination unit 630 is used for negotiating with other network devices except the network device among the at least two network devices according to the identifications of the at least two network devices, and determining a target network device that sends a message 4 to the terminal device.

It should be understood that the network device 600 according to the implementation of the present disclosure may correspondingly perform the method 300 in the implementation of the present disclosure, and the above and other operations and/or functions of each unit in the network device 600 are respectively for realizing each corresponding flow of the method in FIG. 3, and will not be repeated here for the sake of brevity.

Therefore, in an implementation of the present disclosure, a network device can receive a random access preamble that a terminal device sends, and the terminal device receives random access response information sent by at least one network device including the network device according to received indication information. The at least one network device negotiates with each other to determine a network device for a terminal to access, thereby improving the utilization rate of the system.

Figure 7:
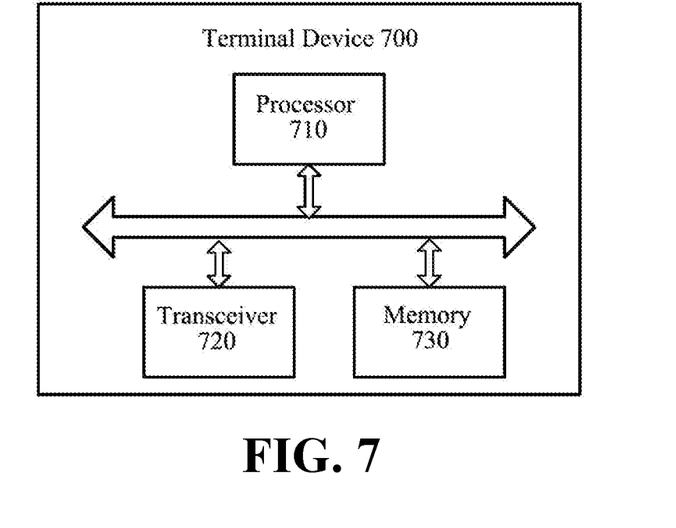
FIG. 7 is another schematic block diagram of a terminal device according to an implementation of the present disclosure.

FIG. 7 shows a schematic block diagram of a terminal device 700 according to an implementation of the present disclosure. As shown in FIG. 7, the terminal device 700 includes a processor 710 and a transceiver 720, and the processor 710 is connected to the transceiver 720. Optionally, the terminal device 700 further includes a memory 730, and the memory 730 is connected to the processor 710. Herein, the processor 710, the memory 730 and the transceiver 720 communicate with each other through an internal connection path to transfer control and/or data signals. The memory 730 may be used to store instructions, and the processor 710 may be used to execute instructions stored in the memory 730 to control the transceiver 720 to transmit information or signals. The transceiver 720 is used for sending a random access preamble, receiving indication information sent by a first network device, and receiving random access response information sent by at least one network device according to the indication information. The at least one network device includes the first network device.

Therefore, in an implementation of the present disclosure, a terminal device sends a random access preamble to a network device, and receives indication information sent by the network device, and the terminal device is indicated through the indication information to receive random access response information sent by at least one network device. As a result, the terminal device can select a network device to access among the at least one network device, thereby improving the utilization rate of the system.

Optionally, the indication information is used for indicating the terminal device to receive the random access response information sent by the first network device and a second network device, wherein the at least one network device includes the second network device. The transceiver 720 is further used for receiving the random access response information sent by the first network device and the second network device.

Optionally, the indication information includes an identification of the at least one network device.

Optionally, the processor 710 is further used for determining a target network device among the at least one network device after the transceiver 720 receives the random access response information sent by the at least one network device according to the indication information. The transceiver 720 is further used for sending a message 3 to the target network device.

Optionally, random access response information of each network device among the at least one network device includes timing advance and/or a load ratio of the each network device, wherein the timing advance is propagation delay of an uplink wireless signal from the terminal device to the each network device. The processor 710 is further used for determining the target network device among the at least one network device according to the timing advance and/or the load ratio.

Optionally, the indication information includes a preset rule, and the processor 710 is further used for determining the target network device among the at least one network device according to the timing advance and/or the load ratio in accordance with the preset rule.

Optionally, the preset rule is to determine that a network device corresponding to minimum timing advance among the at least one network device is the target network device; or the preset rule is to determine that a network device with a minimum load ratio among the at least one network device is the target network device.

Optionally, the processor 720 is further used for sending the message 3 to partial or all network devices among the at least one network device, wherein the message 3 includes identifications of the partial or all network devices. The processor 710 is further used for determining that a network device sending the message 4 is the target network device.

Optionally, the processor 710 is further used for determining a third network device among the at least one network device according to a preset rule, wherein the third network device is one of network devices which configure the terminal device with a same UL Grant which is uplink scheduling signaling. The processor 720 is further used for sending the message 3 to the third network device and other network devices. The other network devices are network devices among the at least one network device except the network devices which configure the terminal device with the same UL Grant.

It should be understood that the terminal device 700 according to the implementation of the present disclosure may correspond to the terminal device 400 in the implementation of the present disclosure and may correspond to a relevant body that performs the method 100 according to the implementation of the present disclosure, and the above and other operations and/or functions of each module in the terminal device 700 are respectively for realizing each corresponding flow of the terminal device in the method shown in FIG. 1, and will not be repeated here for the sake of brevity.

Therefore, in an implementation of the present disclosure, a terminal device sends a random access preamble to a network device, and receives indication information sent by the network device, and the terminal device is indicated through the indication information to receive random access response information sent by at least one network device. As a result, the terminal device can select a network device to access among the at least one network device, thereby improving the utilization rate of the system.

Figure 8:
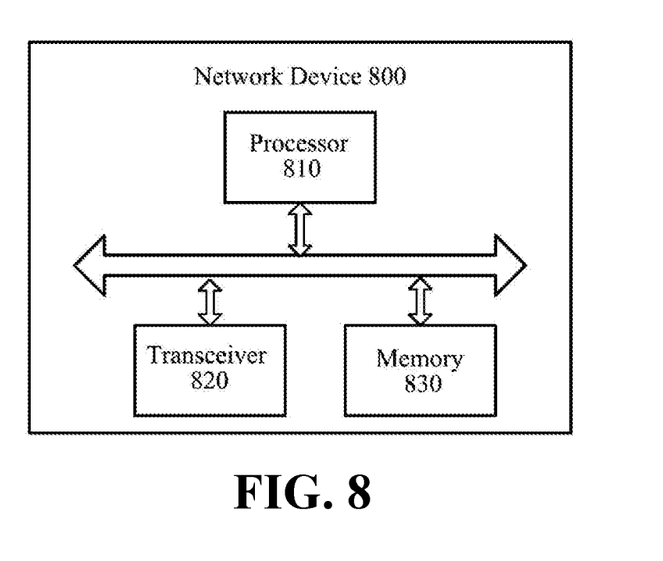
FIG. 8 is yet another schematic block diagram of a network device according to an implementation of the present disclosure.

FIG. 8 shows a schematic block diagram of a network device 800 according to an implementation of the present disclosure. As shown in FIG. 8, the network device 800 includes a processor 810 and a transceiver 820, and the processor 810 is connected to the transceiver 820. Optionally, the network device 800 further includes a memory 830, and the memory 830 is connected to the processor 810. Herein, the processor 810, the memory 830 and the transceiver 820 communicate with each other through an internal connection path to transfer control and/or data signals. The memory 830 may be used to store instructions, and the processor 810 may be used to execute instructions stored in the memory 830 to control the transceiver 820 to transmit information or signals. The transceiver 820 is used for receiving a random access preamble sent by a terminal device, and sending indication information to the terminal device. The indication information is used for indicating the terminal device to receive random access response information sent by at least one network device. The at least one network device includes the network device. The transceiver 820 is further used for sending first random access response information to the terminal device according to the random access preamble.

Therefore, an implementation of the present disclosure provides a network device. With regard to a random access preamble that a terminal device sends to the network device, the network device indicates the terminal device to receive random access response information sent by at least one network device by sending indication information to the terminal device. As a result, the terminal device can select a network device to access among the at least one network device, thereby improving the utilization rate of the system.

Optionally, the indication information includes an identification of the at least one network device.

Optionally, the transceiver 820 is further used for receiving a message 3 sent by the terminal device. The message 3 includes identifications of partial or all network devices among the at least one network device, and the partial or all network devices include the network device. The transceiver 820 is further used for negotiating with other network devices except the network device among the partial or all network devices according to the identifications of the partial or all network devices, and determining a target network device that sends a message 4 to the terminal device.

It should be understood that the network device 800 according to the implementation of the present disclosure may correspond to the network device 500 in the implementation of the present disclosure and may correspond to a relevant body that performs the method 200 according to the implementation of the present disclosure, and the above and other operations and/or functions of each module in the network device 800 are respectively for realizing each corresponding flow of the network device in the method shown in FIG. 2, and will not be repeated here for the sake of brevity.

Therefore, an implementation of the present disclosure provides a network device. With regard to a random access preamble that a terminal device sends to the network device, the network device indicates the terminal device to receive random access response information sent by at least one network device by sending indication information to the terminal device. As a result, the terminal device can select a network device to access among the at least one network device, thereby improving the utilization rate of the system.

Figure 9:
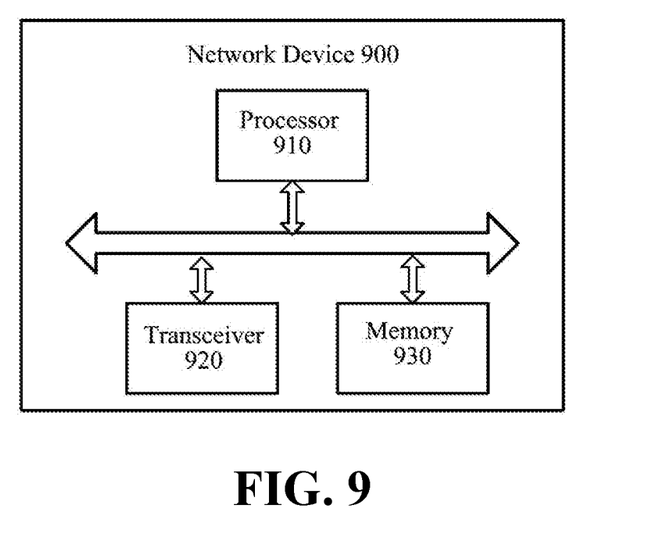
FIG. 9 is yet another schematic block diagram of a network device according to an implementation of the present disclosure.

FIG. 9 shows a schematic block diagram of a network device 900 according to an implementation of the present disclosure. As shown in FIG. 9, the network device 900 includes a processor 910 and a transceiver 920, and the processor 910 is connected to the transceiver 920. Optionally, the network device 900 further includes a memory 930, and the memory 930 is connected to the processor 910. Herein, the processor 910, the memory 930 and the transceiver 920 communicate with each other through an internal connection path to transfer control and/or data signals. The memory 930 may be used to store instructions, and the processor 910 may be used to execute instructions stored in the memory 930 to control the transceiver 920 to transmit information or signals. The transceiver 920 is used for receiving a random access preamble sent by a terminal device, sending second random access response information to the terminal device according to the random access preamble, and receiving a message 3 sent by the terminal device. The message 3 includes identifications of at least two network devices. The processor 910 is used for negotiating with other network devices except the network device among the at least two network devices according to the identifications of the at least two network devices, and determining a target network device that sends a message 4 to the terminal device.

It should be understood that the network device 900 according to the implementation of the present disclosure may correspond to the network device 600 in the implementation of the present disclosure and may correspond to a relevant body that performs the method 300 according to the implementation of the present disclosure, and the above and other operations and/or functions of each module in the network device 900 are respectively for realizing each corresponding flow of the network device in the method shown in FIG. 3, and will not be repeated here for the sake of brevity.

Therefore, in an implementation of the present disclosure, a network device can receive a random access preamble that a terminal device sends, and the terminal device receives random access response information sent by at least one network device including the network device according to received indication information. The at least one network device negotiates with each other to determine a network device for a terminal to access, thereby improving the utilization rate of the system.

It should be noted that the above method implementations of the present disclosure can be applied to or implemented by a processor. The processor may be an integrated circuit chip with signal processing capability. In the implementation process, the actions of the method implementations described above may be completed by integrated logic circuits of hardware in the processor or instructions in the form of software. The above processor may be a general purpose processor, a digital signal processor (DSP), an disclosure specific integrated circuit (ASIC), a field programmable gate array (FPGA) or other programmable logic devices, a discrete gate or transistor logic device, or a discrete hardware component. The processor may implement various methods, acts and logic block diagrams disclosed in implementations of the present disclosure. The general purpose processor may be a microprocessor, or the processor may be any conventional processor or the like. The actions of the method disclosed in connection with the implementation of the present disclosure may be directly embodied by the execution of the hardware decoding processor, or by the execution of a combination of hardware and software modules in the decoding processor. The software modules may be located in a storage medium commonly used in the art, such as a random access memory, flash memory, read-only memory, programmable read-only memory or electrically erasable programmable memory, or register. The storage medium is located in the memory, and the processor reads the information in the memory and completes the actions of the above method in combination with its hardware.

It should be understood that the memory in implementations of the present disclosure may be a transitory memory or non-transitory memory, or may include both transitory and non-transitory memory. The non-transitory memory may be a read-only memory (ROM), programmable ROM (PROM), erasable programmable ROM (EPROM), electrically erasable programmable ROM (EEPROM) or flash memory. The transitory memory may be a random access memory (RAM) which serves as an external cache. By way of example, but not limitation, many forms of RAMs are available, such as, a static random access memory (SRAM), a dynamic random access memory (DRAM), a synchronous dynamic random access memory (SDRAM), a double data rate SDRAM (DDR SDRAM), an enhanced SDRAM (ESDRAM), a Synchlink DRAM (SLDRAM) and a Direct Rambus RAM (DR RAM). It should be noted that the memories of the systems and methods described herein are intended to include, but are not limited to, these and any other suitable types of memories.

The term "and/or" in this document is merely an association relationship describing associated objects, indicating that there may be three relationships, for example, A and/or B may indicate three situations: A alone, A and B, and B alone. In addition, the symbol "/" in this document generally indicates that objects of the former and the latter connected by "/" has an "or" relationship.

Those of ordinary skill in the art may recognize that various exemplary units and algorithm acts described in the implementations disclosed herein may be implemented in electronic hardware, or a combination of computer software and electronic hardware. Whether these functions are implemented in hardware or software depends on the specific application and design constraints of the technical solutions. Skilled artisans may use different methods to implement the described functions for each particular application, but such implementation should not be considered to be beyond the scope of the present disclosure.

Those skilled in the art may clearly understand that for convenience and conciseness of description, the specific working processes of the system, apparatus and unit described above may refer to the corresponding processes in the aforementioned method implementations and will not be described here.

In several implementations provided by the present disclosure, it should be understood that the disclosed systems, devices and methods may be implemented in other ways. For example, the apparatus implementations described above are only illustrative. For example, the division of the units is only a logical function division, and there may be other division manners in actual implementation. For example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The units described as separate components may or may not be physically separated, and the component shown as a unit may or may not be a physical unit, i.e., it may be located in one place or may be distributed over multiple network units. Some or all of the units may be selected according to actual needs to achieve the purpose of solutions of the implementations of the present disclosure.

In addition, various functional units in various implementations of the present disclosure may be integrated in one processing unit, or the various units may be physically present separately, or two or more units may be integrated in one unit.

The functions may be stored in a computer readable storage medium if implemented in the form of software functional units and sold or used as a separate product. Based on this understanding, the technical solution of the present disclosure, in essence, or the part contributing to the prior art, or the part of the technical solution, may be embodied in the form of a software product stored in a storage medium, including a variety of instructions for causing a computer device (which may be a personal computer, a server, or a network device) to perform all or part of the acts of the method described in various implementations of the present disclosure. The aforementioned storage media include U disk, mobile hard disk, read-only memory, random access memory, magnetic disk or optical disk, and other media capable of storing program codes.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be the protection scope defined by the claims.

I claim:

1. A method for random access, comprising:
sending, by a terminal device, a random access preamble;
receiving, by the terminal device, indication information sent by a first network device;
receiving, by the terminal device, random access response information sent by at least one network device according to the indication information, wherein the at least one network device comprises the first network device and a second network device, wherein the indication information comprises a preset rule, wherein the random access response information of each network device among the at least one network device comprises at least one of timing advance or a load ratio of the each network device, and wherein the timing advance is propagation delay of an uplink wireless signal from the terminal device to the each network device; and
after the terminal device receives the random access response information sent by the at least one network device, determining, by the terminal device, a target network device among the at least one network device according to at least one of the timing advance or the load ratio in accordance with the preset rule, and sending, by the terminal device, a message 3 to the target network device.

2. The method according to claim 1, wherein the indication information comprises an identification of the at least one network device.

3. The method according to claim 1, wherein
the preset rule is to determine that a network device corresponding to minimum timing advance among the at least one network device is the target network device; or
the preset rule is to determine that a network device with a minimum load ratio among the at least one network device is the target network device.

4. The method according to claim 1, wherein determining, by the terminal device, the target network device among the at least one network device comprises:
sending, by the terminal device, the message 3 to partial or all network devices among the at least one network device, wherein the message 3 comprises identifications of the partial or all network devices; and
determining, by the terminal device, that a network device sending the message 4 is the target network device.

5. The method according to claim 4, wherein sending, by the terminal device, the message 3 to partial network devices among the at least one network device comprises:

determining, by the terminal device, a third network device among the at least one network device according to a preset rule, wherein the third network device is one of network devices which configure the terminal device with a same Uplink (UL) Grant which is uplink scheduling signaling; and
sending, by the terminal device, the message 3 to the third network device and other network devices, wherein the other network devices are network devices among the at least one network device except the network devices which configure the terminal device with the same UL Grant.

6. A method for random access, comprising:
receiving, by a first network device, a random access preamble sent by a terminal device;
sending, by the first network device, indication information to the terminal device, wherein the indication information is used for indicating the terminal device to receive random access response information sent by at least one network device, and wherein the at least one network device comprises the first network device and a second network device;
sending, by the first network device, first random access response information to the terminal device according to the random access preamble;
receiving, by the first network device, a message 3 sent by the terminal device, wherein the message 3 comprises identifications of partial or all network devices among the at least one network device, and wherein the partial or all network devices comprise the first network device;
negotiating, by the first network device, with other network devices except the first network device among the partial or all network devices according to the identifications of the partial or all network devices; and
determining a target network device that sends a message 4 to the terminal device.

7. A terminal device, comprising:
a transceiver, used for sending a random access preamble, receiving indication information sent by a first network device, and receiving random access response information sent by at least one network device according to the indication information, wherein the at least one network device comprises the first network device and a second network device, wherein the indication information comprises a preset rule, wherein the random access response information of each network device among the at least one network device comprises at least one of timing advance or a load ratio of the each network device, and wherein the timing advance is propagation delay of an uplink wireless signal from the terminal device to the each network device; and
a processor, used for determining a target network device among the at least one network device to at least one of the timing advance or the load ratio in accordance with the preset rule after the transceiver receives the random access response information sent by the at least one network device,
wherein the transceiver is further used for sending a message 3 to the target network device.

8. The terminal device according to claim 7, wherein the indication information comprises an identification of the at least one network device.

9. The terminal device according to claim 7, wherein
the preset rule is to determine that a network device corresponding to minimum timing advance among the at least one network device is the target network device; or
the preset rule is to determine that a network device with a minimum load ratio among the at least one network device is the target network device.

10. The terminal device according to claim 7, wherein
the transceiver is further used for sending the message 3 to partial or all network devices among the at least one network device, wherein the message 3 comprises identifications of the partial or all network devices; and
the processor is further used for determining that a network device sending the message 4 is the target network device.

11. The terminal device according to claim 10, wherein
the processor is further used for determining a third network device among the at least one network device according to a preset rule, wherein the third network device is one of network devices which configure the terminal device with a same Uplink (UL) Grant which is uplink scheduling signaling; and
the transceiver is further used for sending the message 3 to the third network device and other network devices, wherein the other network devices are network devices among the at least one network device except the network devices which configure the terminal device with the same UL Grant.

12. The method according to claim 1, wherein the indication information is used for indicating the terminal device to receive the random access response information sent by the first network device and the second network device; and
receiving, by the terminal device, the random access response information sent by the at least one network device according to the indication information comprises: receiving, by the terminal device, the random access response information sent by the first network device and the second network device.

13. The terminal device according to claim 7, wherein
the indication information is used for indicating the terminal device to receive the random access response information sent by the first network device and the second network device; and
the transceiver is further used for receiving the random access response information sent by the first network device and the second network device.

* * * * *